(12) United States Patent  (10) Patent No.: US 6,172,849 B1
Schick  (45) Date of Patent: *Jan. 9, 2001

(54) APPARATUS FOR RETAINING A DISK CARTRIDGE SHUTTER IN A CLOSED POSITION

(75) Inventor: Brian Schick, San Diego, CA (US)

(73) Assignee: Iomega Corporation, Roy, UT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/924,013

(22) Filed: Aug. 29, 1997

(51) Int. Cl.[7] .................................................... G11B 23/03
(52) U.S. Cl. ................................................................ 360/133
(58) Field of Search ............................... 360/133; 369/291

(56) References Cited

U.S. PATENT DOCUMENTS

| Re. 32,876 | 2/1989 | Wakabayashi et al. | 360/133 |
|---|---|---|---|
| 4,517,617 | 5/1985 | Tsuji et al. | 360/133 |
| 4,652,961 | 3/1987 | Dieffenbach | 360/133 |
| 4,717,981 | * 1/1988 | NIgam et al. | 360/133 |
| 4,797,770 | * 1/1989 | Takahasi | 360/133 |
| 5,381,402 | * 1/1995 | Lee et al. | 360/133 |
| 5,546,376 | * 8/1996 | Taniyama | 369/291 |

FOREIGN PATENT DOCUMENTS

| 0146656 | * 7/1985 | (EP) | 360/133 |
|---|---|---|---|
| 5-250837 | * 9/1993 | (JP) | 360/133 |

* cited by examiner

Primary Examiner—Brian E. Miller
(74) Attorney, Agent, or Firm—Woodcock Washburn Kurtz Mackiewicz & Norris LLP

(57) ABSTRACT

A disk cassette for use in a disk drive. The cassette employs a detent mechanism to resistively retain a shutter in a closed position. This shutter is opened by applying a force greater than the resistive force of the detent mechanism. The detent mechanism eliminates the need for a spring bias to retain the shutter in a closed position.

18 Claims, 6 Drawing Sheets

APPARATUS FOR RETAINING A DISK CARTRIDGE SHUTTER IN A CLOSED POSITION

BACKGROUND OF THE INVENTION

This invention relates to disk cartridges for use with a removable media disk drive. More particularly, the invention relates to an apparatus for retaining a shutter in a closed position when the cartridge is not in use.

Cartridge based tape and disk data storage devices for storing digital electronic information have been in use in the computer industry for several decades. Removable disk cartridges typically comprise an outer casing or shell that houses a disk-shaped magnetic, magneto-optical or optical storage medium upon which information can be stored. The cartridge shell often comprises upper and lower halves that are joined together to house the disk. Magnetic disk media can be either rigid or flexible and are mounted on a hub that rotates freely within the cartridge. When the cartridge is inserted into a disk drive, a spindle motor in the drive engages the disk hub in order to rotate the disk within the cartridge at a given speed. The outer shell of the cartridge typically has a media access opening near one edge to provide the recording heads of the drive with access to the disk. A shutter or door mechanism is provided to cover the head access opening when the cartridge is not in use to prevent dust or other contaminants from entering the cartridge and settling on the recording surface of the disk.

When a disk cartridge is inserted into a disk drive, an arm engages the shutter and slides it toward the open position. However, when the disk cartridge is outside of a disk drive, the shutter must be kept in the closed position. Commonly, a spring is encased within the cartridge shell and provides a bias to the shutter toward the closed position. As a result, as the cartridge is ejected from the drive, the arm disengages from the shutter and the spring bias returns the shutter to the closed position. Although the spring generally achieves works, the spring has several drawbacks. For example, the spring adds complexity to the construction of the disk cartridge and, additionally, occupies valuable space within the cartridge shell. Accordingly, if the spring were not present in the cartridge the space would be available for media, allowing a smaller, less complex cartridge.

A prior art cartridge is disclosed in U.S. Pat. No. 4,517,617 (Tsuji). The Tsuji patent is generally directed to a disk cassette that contains a flexible magnetic disk having a center core (i.e., a hub) and an apparatus for reading and recording information on the flexible magnetic disk. The disk cassette comprises a flexible disk attached to a hub. The disk and hub assembly are sandwiched between an upper cover and a lower cover. To constrain the movement of the flexible disk within the cover, the hub has a center hollow which mates with a projection from the upper cover of the cassette. The shutter moves laterally across the faces of the disk cartridge exposing or covering a disk access opening.

The above disk and drive arrangements present a variety of drawbacks when applied to disk and cartridge systems of smaller physical dimensions. To reduce the overall dimensions of the drive and disk cassette, drawbacks of the prior art disk cassettes and removable media drives must be overcome.

SUMMARY OF THE INVENTION

The present invention is directed to a magnetic disk cartridge that comprises an outer shell having an access opening formed along a peripheral edge, a magnetic medium rotatably disposed within the outer shell, a portion of said medium being accessible via the access opening, a shutter movably disposed on the outer shell between a first position and a second position, and a detent means coupled between the shutter and the outer shell, the detent means being adapted to resistively retain the shutter in the first position.

The detent means comprises a projection attached to either the shutter and the outer shell, but preferably the outer shell. Additionally, the detent means further comprises a flexible shaft, with the projection being disposed on a distal end of the shaft. The detent means also comprises a cut-out, preferably on the shutter, that is adapted to engage said projection.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENT

Figure 1:
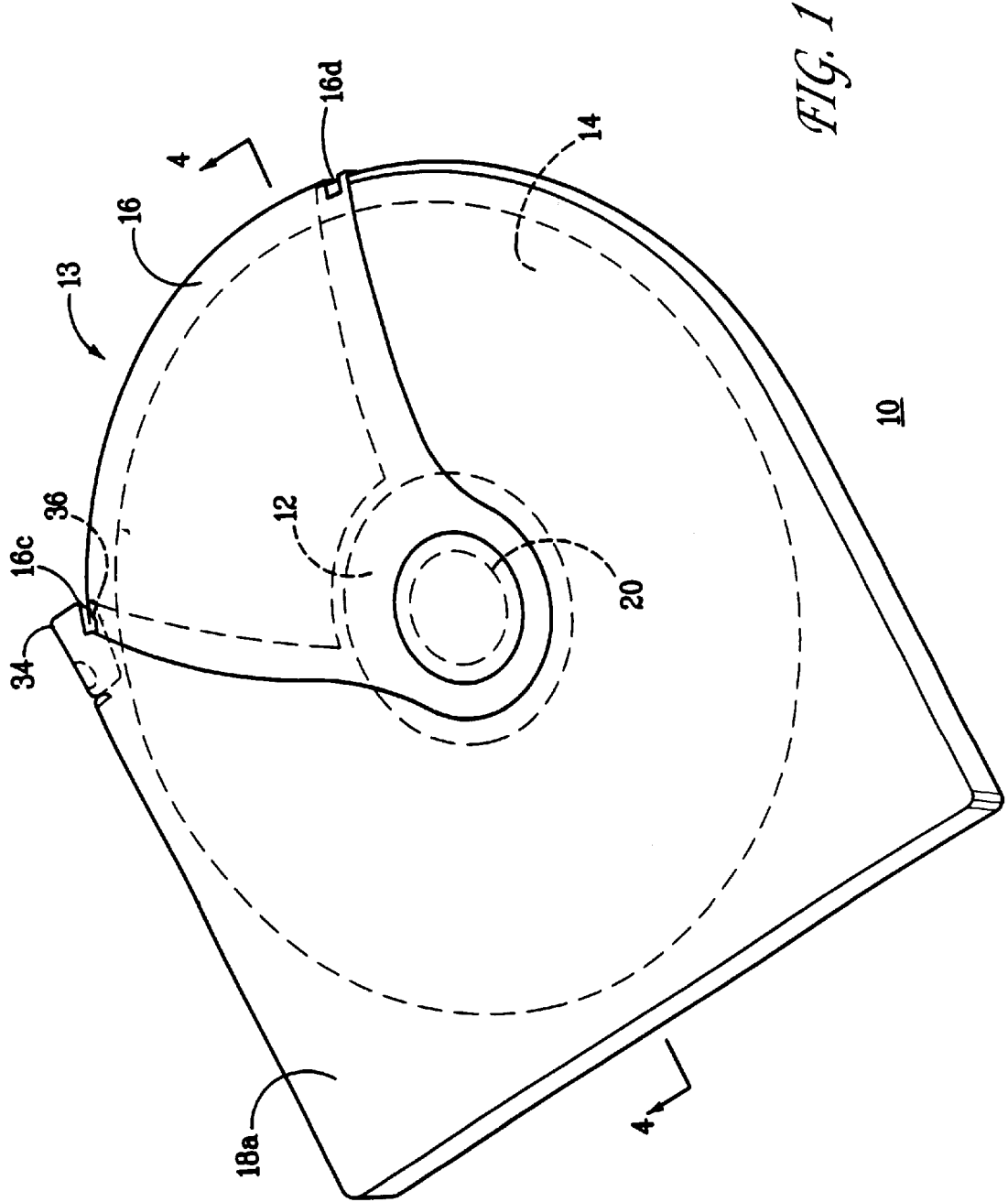
FIG. 1 is a top view of a cartridge that incorporates aspects of the invention.

The present invention provides a data storage cartridge for use with a removable media type of disk drive. Throughout the description, a preferred embodiment of the invention is described in connection with a particular sized and shaped disk cartridge. However, the disk cartridge dimensions and shape are presented for exemplary purposes only. For example, it is not necessary that the shutter retention mechanism is used with a cartridge of any particular size or shape. The particular disk cartridge shown is merely provided to illustrate the operation of the shutter retention mechanism. Accordingly, the shutter retention mechanism should not be limited to the particular cartridge embodiment shown as the invention contemplates the application to other cartridge types and configurations.

FIGS. 1–4 present top, bottom, side and cut-away side views of a disk cartridge that embodies aspects of the present invention. The disk cartridge comprises a flexible magnetic disk 14, a disk center hub 12, top and bottom cartridge shell halves 18a and 18b, a rotary shutter 16, a shutter pivot pin 20 and shutter retention mechanism 34. Shutter 16 rotates upon the cartridge 10 between an open position and a closed position. In the open position, shutter 16 is rotated away from a generally wedge shaped disk access opening 13 that is formed in cartridge shell 18, exposing the top and bottom surfaces of disk 14 for access by a read/write head or heads contained within a disk drive. In the closed position, shutter 16 is rotated over disk access opening 13, sealing disk cartridge 10 and protecting disk 14. As described in further detail below, disk retention mechanism 34 and cooperating shutter detent 16c retain the shutter 16 in the closed position until sufficient force is applied to shutter 16 to overcome the resistance of retention mechanism 34. Cut-out 16d provided in shutter 16 provides an engagement surface for applying a rotational force in the present embodiment.

The flexible magnetic disk 14 is formed of a thin polymer film, such as MYLAR, and has a thin magnetic layer uniformly dispersed on the top and bottom surfaces. The magnetic surfaces magnetically sensitize the flexible film and enable the storage of digital data when the surface is brought into magnetic communication with a magnetic transducer of the type commonly found in disk drives. Disk 14 is generally circular with a circular hole proximate the center of disk 14. Hub 12 is firmly secured to disk 14 such that the center of Hub 12 is aligned proximate the center of disk 14. Hub 12 is preferably attached to disk 14 via a well-known adhesive process. The disk and hub assembly are rotatably disposed between upper and lower cartridge shell halves 18a, 18b. Rotatable shutter 16 is rotatably disposed on the exterior of the cartridge shells 18a, 18b.

Figure 2:
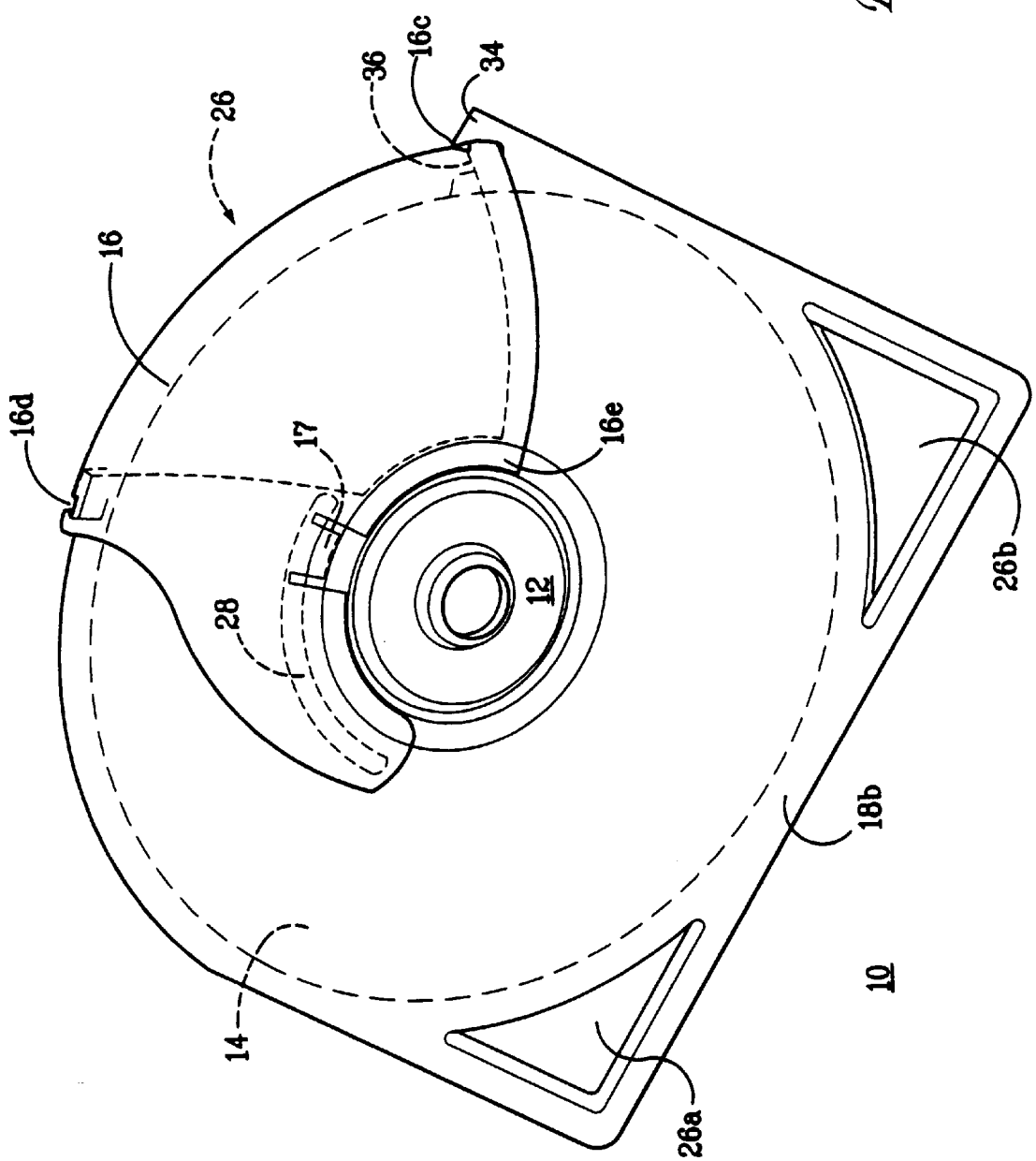
FIG. 2 is a bottom view of a cartridge that incorporates aspects of the invention.
Figure 5:
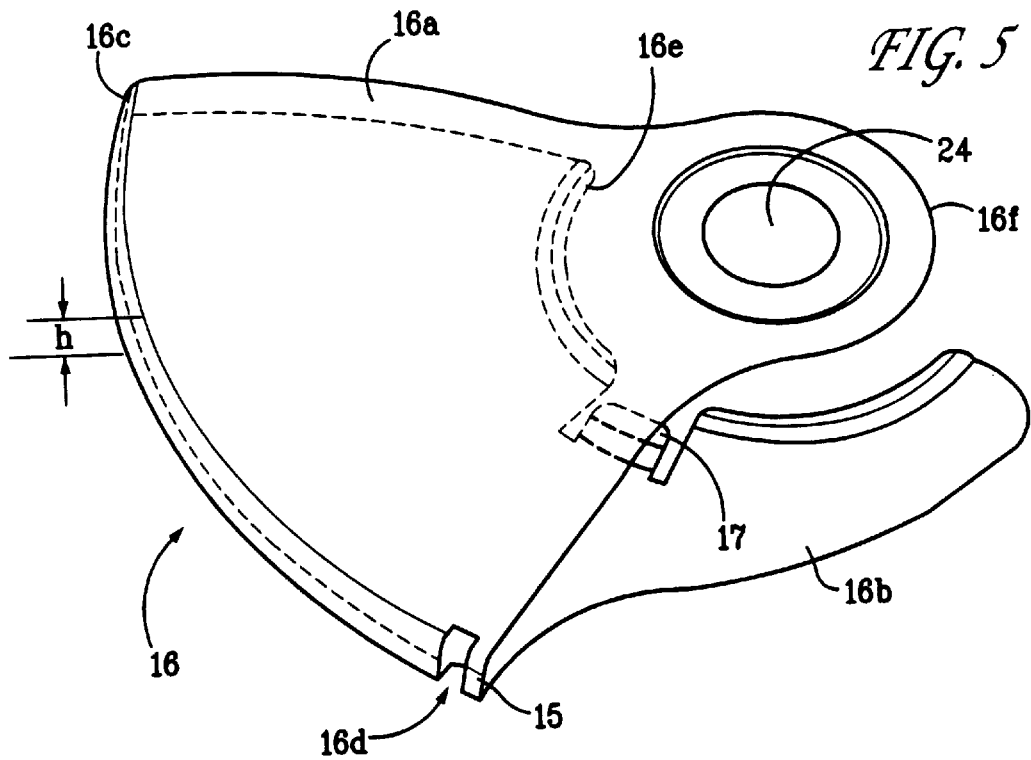
FIG. 5 is a perspective view of a cartridge shutter of the invention.

Referring also to FIG. 5, shutter 16 further comprises a pivot opening 24 with a circular depression 24 that surrounds pivot hole 24, a tongue 17 and raised rim 16e. Pivot hole 24 and circular depression 24 provide an attachment surface for attaching the shutter to the top shell portion 18a. Tongue 17 and raised rim 16e combine to hold shutter 16 against bottom shell 18b. Tongue 17 slides within slot 28, which is cut into the bottom shell 18b. As best shown in FIG. 2, tongue 17 and raised rim 16e combine to retain shutter 16 on bottom shell 18b while allowing shutter 16 to rotate between an open position and a closed position. As described in further detail below, small cut-out 16c provides a mechanism to retain shutter 16 in a closed position. Large cut-out 16d provides an abutment adapted to receive a disk drive lever for applying a rotational force to shutter 16 to move shutter 16 between open and closed positions.

Figure 4:
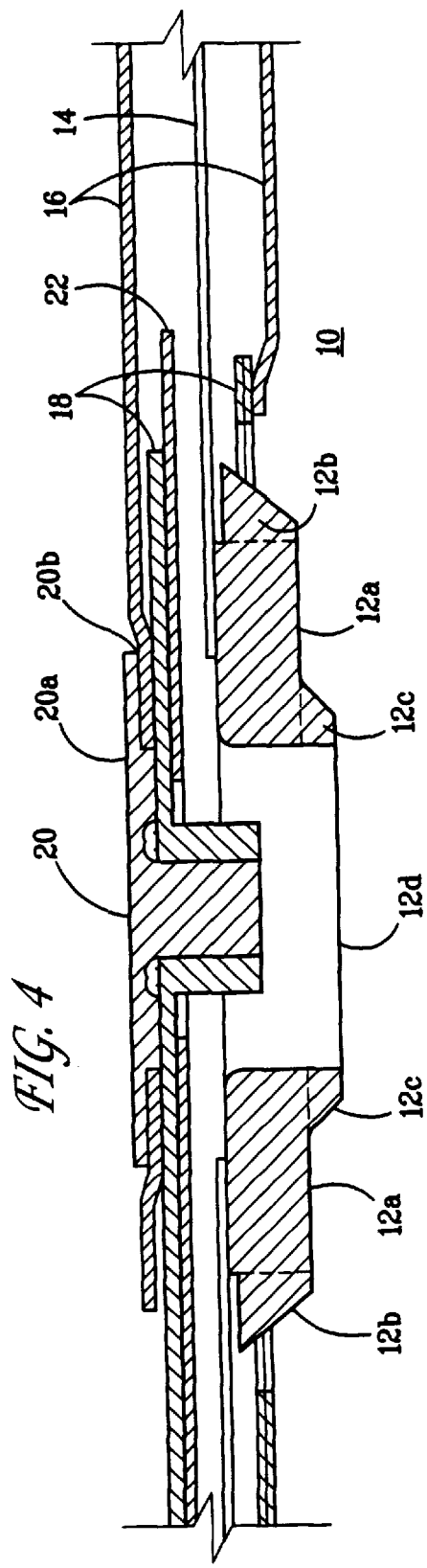
FIG. 4 is a cut-away side view through line 4—4 of FIG. 1.

As best shown in FIGS. 1 and 4, pivot pin 20 extends through shutter pivot hole 24 and into a pin receptacle 18c to pivotally retain shutter 16 against cartridge 18. Pivot pin 20 comprises a flat, circular head portion 20a that has an annular groove 20b on the underside of head portion 20a. Clearance between groove 20b and depression 24 permit shutter 16 to rotate while fixing pivot pin 20 to shell portion 18a.

Figure 3:
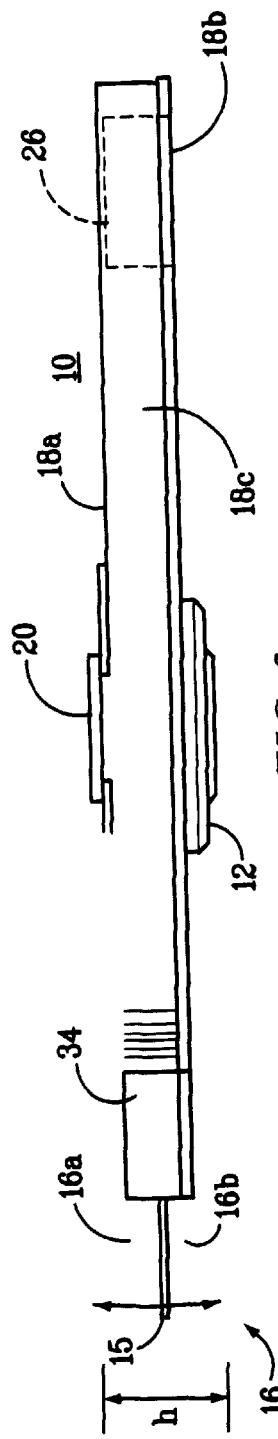
FIG. 3 is a side view of a cartridge that incorporates aspects of the invention.

As best shown in FIG. 3, cartridge 10 is preferably very thin (e.g., about half the thickness of a typical 1.44 MB floppy disk cartridge). Typical floppy shutters are formed of a single piece of folded sheet steel. Although a single piece shutter may also be viable for shutter 16, the relative thin height "h" of shutter 16 along with its radial shape combine to make conventional shutter manufacturing techniques undesirable. Accordingly shutter 16 is preferably constructed from two stamped pieces of sheet steel 16a, 16b that are welded together along seam 15. The seam 15 can be formed from two overlapping edges of top and bottom shutter halves 16a, 16b or, alternatively, can be formed of a butt joint whereby the edges of top and bottom shutter portions are welded end to end.

The relative thinness of cartridge 10 also requires thin shell material. However, material, such as molded plastic shells, used in conventional disk cartridges would have to be relatively thick to meet the dimensional stability requirements. Therefore, rather than plastic, the outer shells 18a, 18b are formed of stamped sheet steel. In that way, shell portions 18, and consequently cartridge 10, can be made thinner than plastic shells of similar strength and stability.

Bottom sheet 18b is formed of a flat sheet of steel with two raised support platforms 26a, 26b. Whereas, the top sheet 18a is formed of a sheet of steel with sides 18c. As best shown in the side profile of disk 10 of FIG. 3, top and bottom halves 18 are joined together such that the top shell portion 18a is welded to bottom shell portion 18b where the top and bottom portion 18a, 18b meet along sides 18c. Support platforms 26 provide additional support and stability to cartridge 10, as the top of support platforms 26 meet with the inside of top shell 18a. Additional strength can be added to the cartridge by spot welding the top of support platforms 26 to the top shell 18a.

Figure 6:
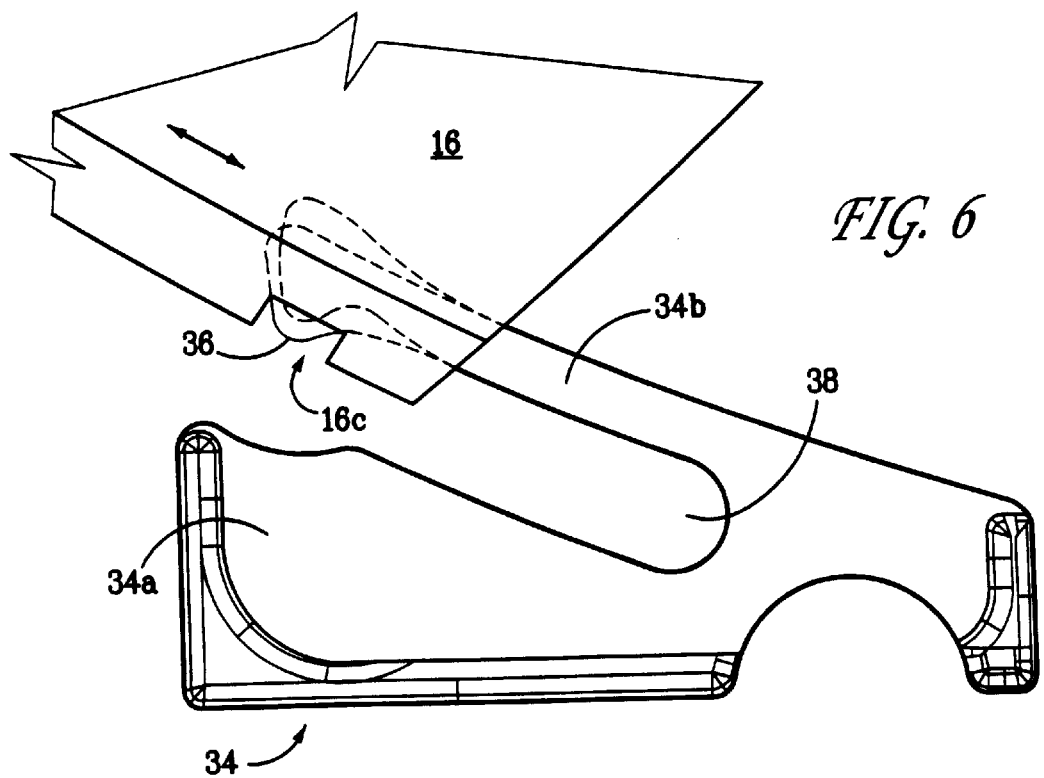
FIG. 6 is a top view of a shutter retention mechanism of the invention.
Figure 7:
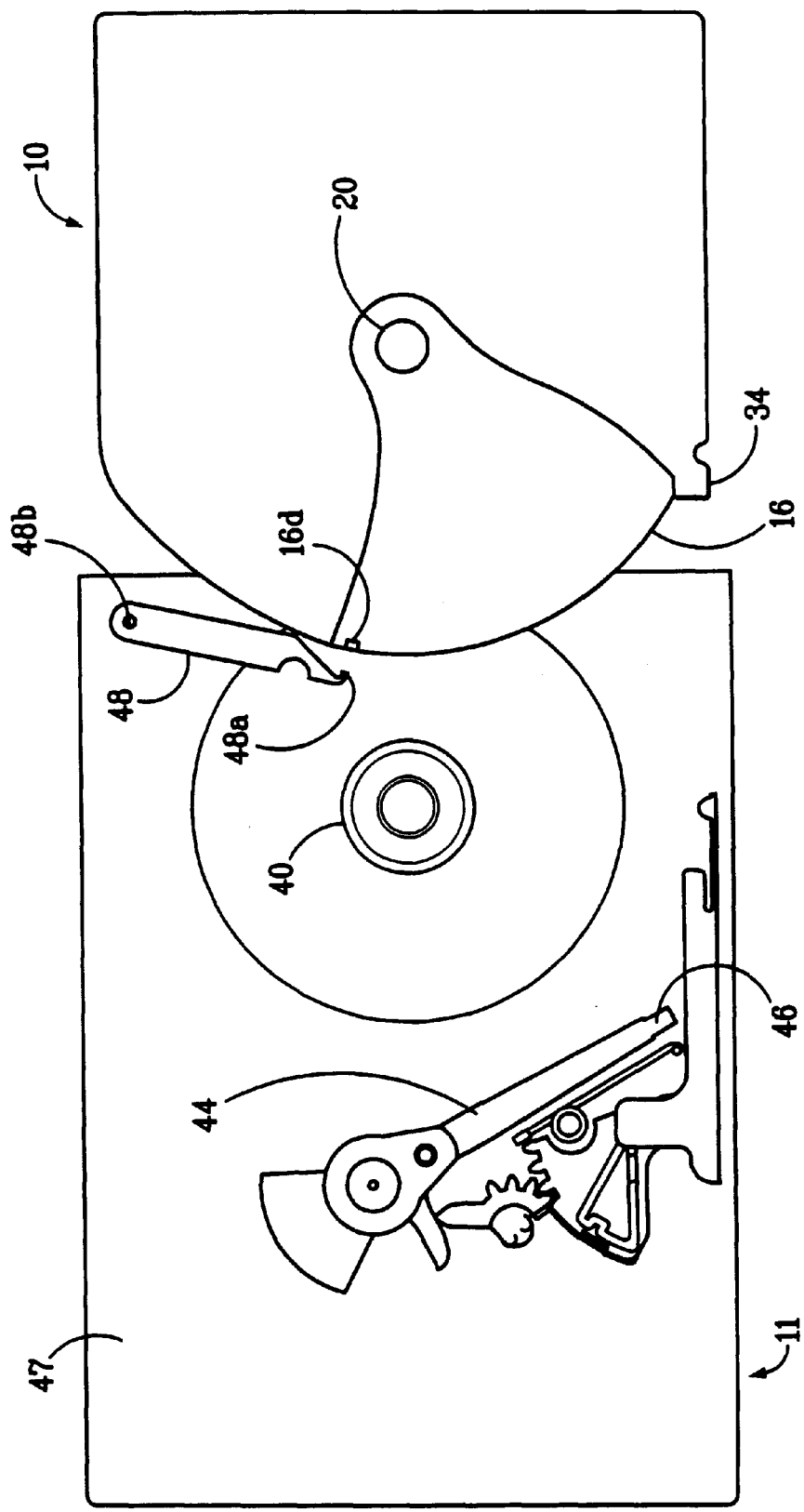
FIG. 7 is a top view showing details of a drive for use with a cartridge of the present invention and shows the cartridge during insertion into the drive.

Shutter 16 is resistively retained in the closed position by a detent mechanism comprising detent member 34 in cooperation with shutter cut-out 16c. FIG. 6 provides a detailed view of the operation of detent member 34. The outline of detent member 34 is substantially polygonal in shape and comprises a base portion 34a, a shaft portion 34b with a protruding portion 36 proximate a distal end, and a cut-out portion 38. Preferably, detent member 34 is formed of a resilient material such as plastic so that shaft portion 34b can flex (as shown in phantom) and is adhesively attached to the cartridge shell 18. However, those skilled in the art will appreciate that detent member 34, alternately, can be integrally formed with the cartridge shell 18. Moreover, a similar retention function can be performed by reversing the location of the detent member 34 and the cut-out portion 16c. That is, whereas FIG. 6 shows the detent member attached to the cartridge shell and the cut-out 16c formed in the shutter. The mechanism could be reversed having the detent member attached to the shutter and a corresponding cut-out formed in the cartridge shell.

Operationally, shaft portion 34b flexibly releases shutter 16 when a rotational force is applied to shutter 16. For example, when shutter 16 is in a closed position, protruding portion 36 rests within cut-out 16c, thereby restraining movement of shutter 16. Thereafter, as shutter 16 rotates toward the open position, shutter cut-out 16c engages the cammed face of protruding portion 36 and causes shaft 34b to flex. As the protruding portion 36 mates with cut-out 16c, shaft portion 34b returns to its normal state as the protruding portion enters the cut-out. As a result, the shutter is resistively retained in the closed position. When shutter 16 is rotated toward the open position, cut-out 16c engages the cammed face of protruding portion 36. Protruding portion 36 rides up inside shutter 16 until shutter 16 rotates away from detent member 34 and toward the open position.

The opening 38 provides a catch for shutter 16. If shutter 16 is overrotated such that cut-out 16c passes over protruding portion 36 without engaging, shutter 16 will strike against the stop at the end of opening 38. As a result, further rotation and damage to the shutter or disk cartridge is prevented.

The detent mechanism eliminates the need for a spring to retain the shutter in the closed position. As a result, the space inside of the cartridge is available for additional media. Moreover, as described in further detail below, the shutter is held in a closed position without the need for a lock mechanism that would require a correspondingly complicated mechanism within the drive to unlock the shutter.

Figure 8:
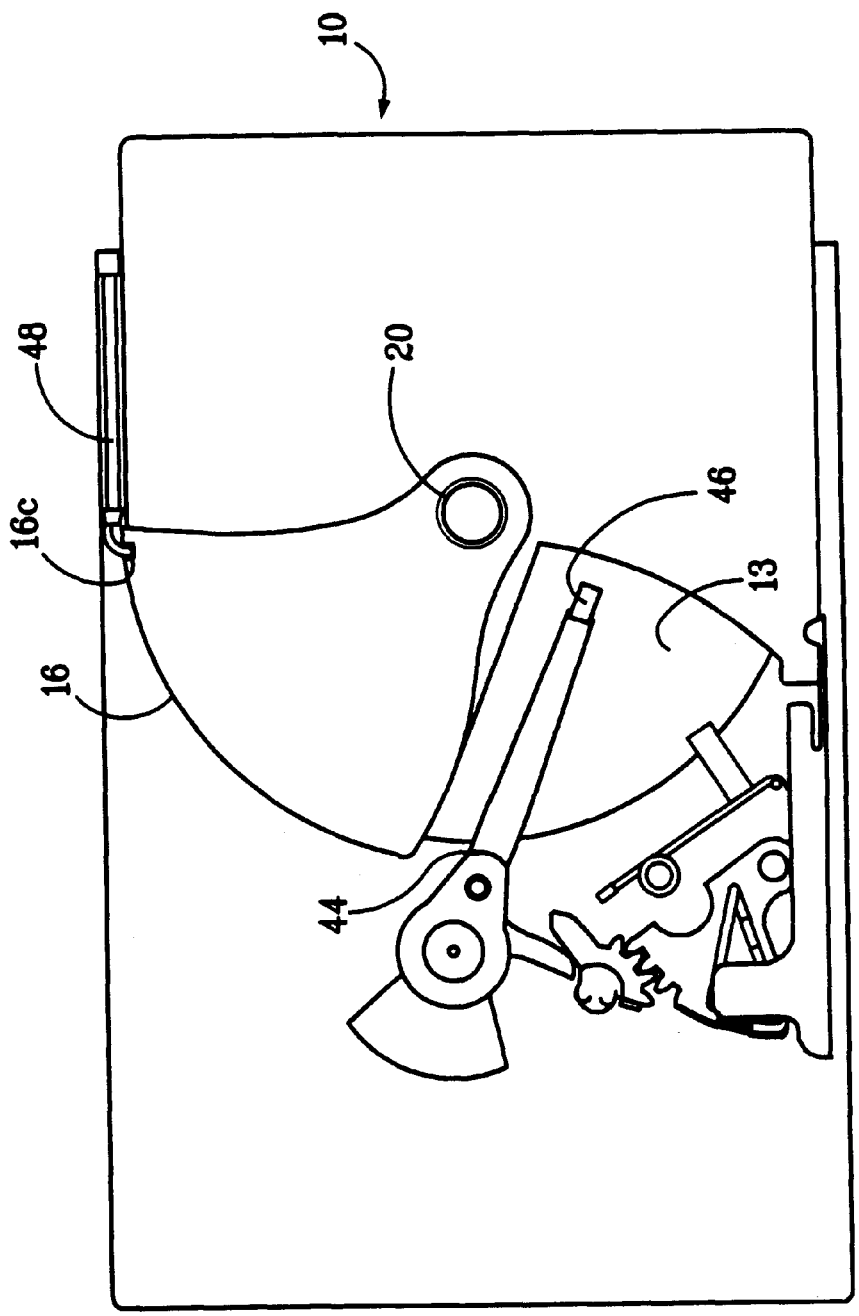
FIG. 8 is a top view of the cartridge after insertion into the drive.

Referring now to FIGS. 8 and 9, the operation of shutter 16 is illustrated during the insertion and ejection of a disk cartridge from a disk drive 11. Drive 11 comprises a chassis 47, a spindle 40 controlled by a drive motor (not shown), an actuator 44 having a pair of read/write heads 46 disposed on the ends of opposing arms, and a shutter operating arm 48. Actuator 44 is depicted as a radial actuator disposed proximate the back end of chassis 47. Spindle 40 is disposed on chassis 47 proximate the front portion. And, shutter operating arm 48 is disposed proximate one side and proximate a front edge of chassis 47. Shutter operating arm 48 comprises a finger 48a adapted to engage cut-out 16d on shutter 16 and pivot 48b about which arm 48 pivots.

Before cartridge 10 is inserted into drive 11 (FIG. 8), shutter 16 is kept in the closed position by detent member 34 and cut-out 16c. Cartridge 10 is inserted a predetermined distance into drive 11, finger 48a engages cut-out 16d. As cartridge 10 is urged even further into drive 11, shutter operating arm 48 pivots about pivot 48b, overcomes the retaining force of detent member 34, and rotates shutter 16 away from shutter access opening 13 (FIG. 9).

The closure of shutter 16 occurs during cartridge 10 ejection from drive 11 in reverse order of shutter opening. When cartridge 10 is ejected from drive 11, finger 48a, still engaging cut-out 16c, rotates shutter 16 to the closed position. When the shutter has rotated to the completely closed position, detent member 34 once again engages cutout 16c to hold shutter 16 in the closed position.

Although a particular embodiment of the invention has been shown and described, other embodiments and modifications will occur to those of ordinary skill in the art which fall within the scope of the appended claims.

What is claimed is:

1. A magnetic disk cartridge comprising:
   an outer shell having an access opening formed along a peripheral edge;
   a magnetic medium rotatably disposed within said outer shell, a portion of said medium being accessible via the access opening;
   a shutter having a top side, bottom side and peripheral edge disposed between said top and bottom sides movably disposed on said outer shell between a first position and a second position; and
   a detent mechanism on the peripheral edge of shutter coupling said shutter with said outer shell, said detent mechanism resistively retaining said shutter in said first position such that said shutter releases from said first position by a force applied to move said shutter toward said second position that overcomes the resistance of the detent mechanism.

2. The magnetic disk cartridge as recited in claim 1 wherein said detent mechanism comprises a projection attached to at least one of the shutter and the outer shell.

3. The magnetic disk cartridge as recited in claim 2 wherein said detent mechanism comprises a flexible shaft, said projection being disposed on a distal end of said shaft.

4. The magnetic disk cartridge as recited in claims 2 or 3 wherein said detent mechanism comprises a detent disposed on one of said shutter and said outer shell and wherein said projection is disposed on the other one of said shutter and said outer shell said detent being engagable by said projection.

5. The magnetic disk cartridge as recited in claim 2 wherein said projection comprises a cammed face.

6. A magnetic disk cartridge as recited in claim 1 wherein said shutter moves between said first position and said second position along a rotary path.

7. A magnetic disk cartridge comprising:
   an outer shell having an access opening formed along a peripheral edge;
   a storage medium rotatably disposed within said outer shell, a portion of said medium being accessible via the access opening;
   a protruding member flexibly coupled to said outer shell; and
   a shutter movably disposed with respect to said outer shell between a first position and a second position, said shutter having a cut-out adapted to engage said protruding member when said shutter is in said first position, said protruding member flexing away from said cut-out thereby releasing said shutter only by a force that is applied that moves said shutter toward said second position.

8. The magnetic disk cartridge as recited in claim 7, wherein said protruding member is coupled to said outer shell proximate a peripheral edge thereof.

9. The magnetic disk cartridge as recited in claim 7, wherein said detent is located proximate a peripheral edge of said shutter.

10. The magnetic disk cartridge as recited in claim 7, wherein said protruding member further comprises a flexible portion such that said protruding member disengages from said detent when a opening force is applied to said shutter.

11. The magnetic disk cartridge as recited in claim 7, further comprising a stop coupled to said outer shell so that said shutter movement is constrained.

12. The magnetic disk cartridge as recited in claim 7, wherein said shutter moves between said first portion and said second position along a rotary path.

13. In a magnetic disk cartridge of the type having a rotatable magnetic medium disposed within an outer shell, and a shutter disposed on said outer shell, said shutter being movable between and open position and a closed position, a shutter restraint mechanism, comprising:
   a detent member coupled to said outer shell, said detent member having a flexible arm portion and a protrusion, said protrusion being coupled to a distal end of said flexible arm; and
   a cut-out formed in a surface of said shutter, said cut-out being adapted to engage said protrusion when said shutter is moved to said closed position and to disengage from said protrusion by causing said protrusion to flex out of the way, said flexing caused only by the force of the shutter movement toward said open position.

14. The magnetic disk cartridge as recited in claim 13 wherein said shutter moves between said open and closed positions along a rotary path.

15. A method for latching a shutter in a closed position, comprising the steps of:
   a) providing a cartridge having a rotatable storage medium disposed within an outer shell;
   b) movably disposing a shutter with respect to said outer shell between an open and a closed position;
   c) resistively retaining said shutter in said closed position by way of a flexible arm so that said shutter is released by a force that is applied to move said shutter toward said open position only said moving force causing the arm to flex thereby reducing the resistance to opening of the shutter.

16. The method as recited in claim 15 wherein said storage medium comprises a magnetic medium.

17. The method as recited in claim 15 wherein said step b) further comprises the step of rotatably attaching said shutter to said outer shell.

18. The method as recited in claim 15 wherein the step c) further comprises the step of providing a flexible shaft that resiliently retains said shutter in said closed position.

* * * * *